UNITED STATES PATENT OFFICE.

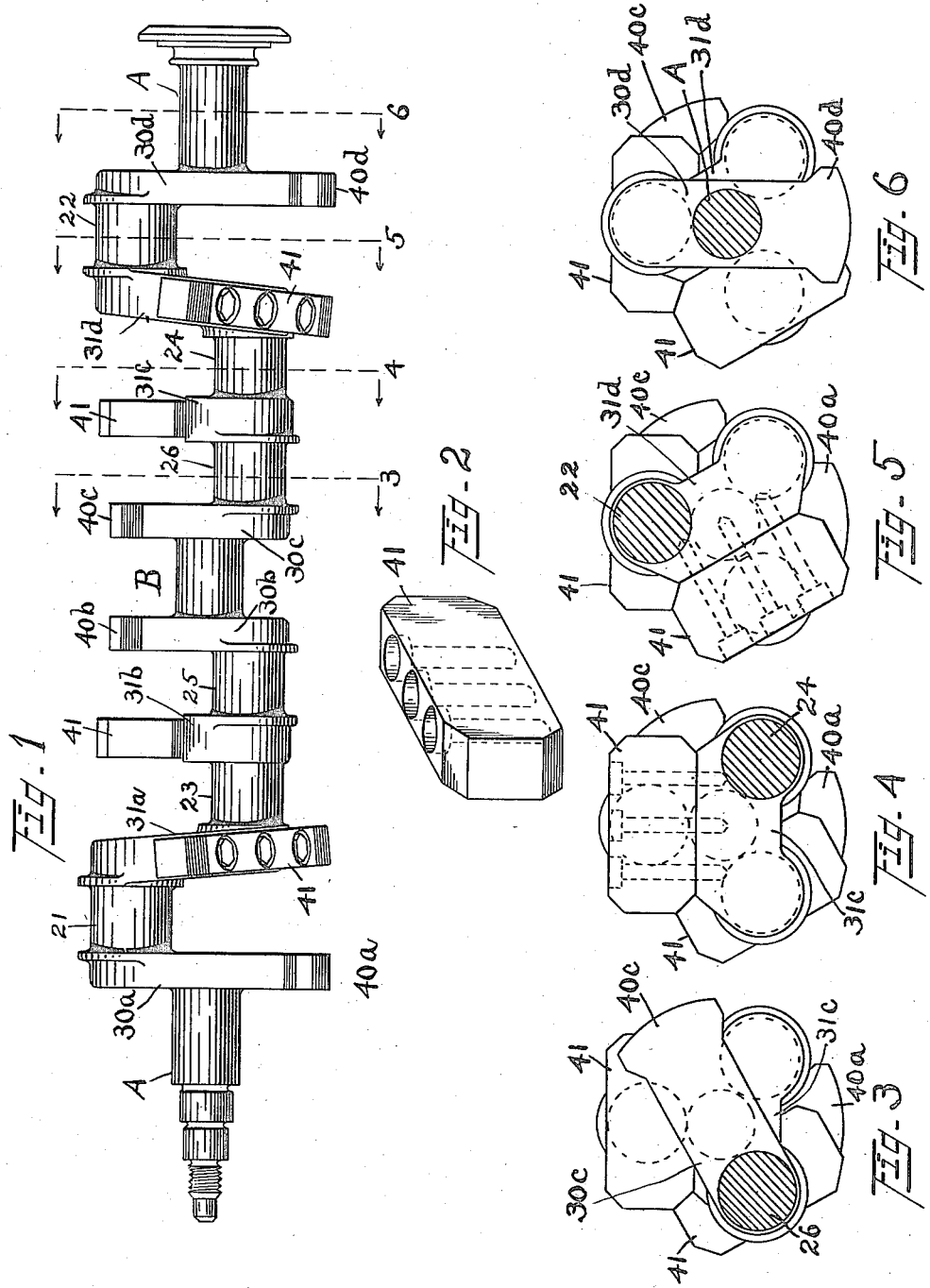

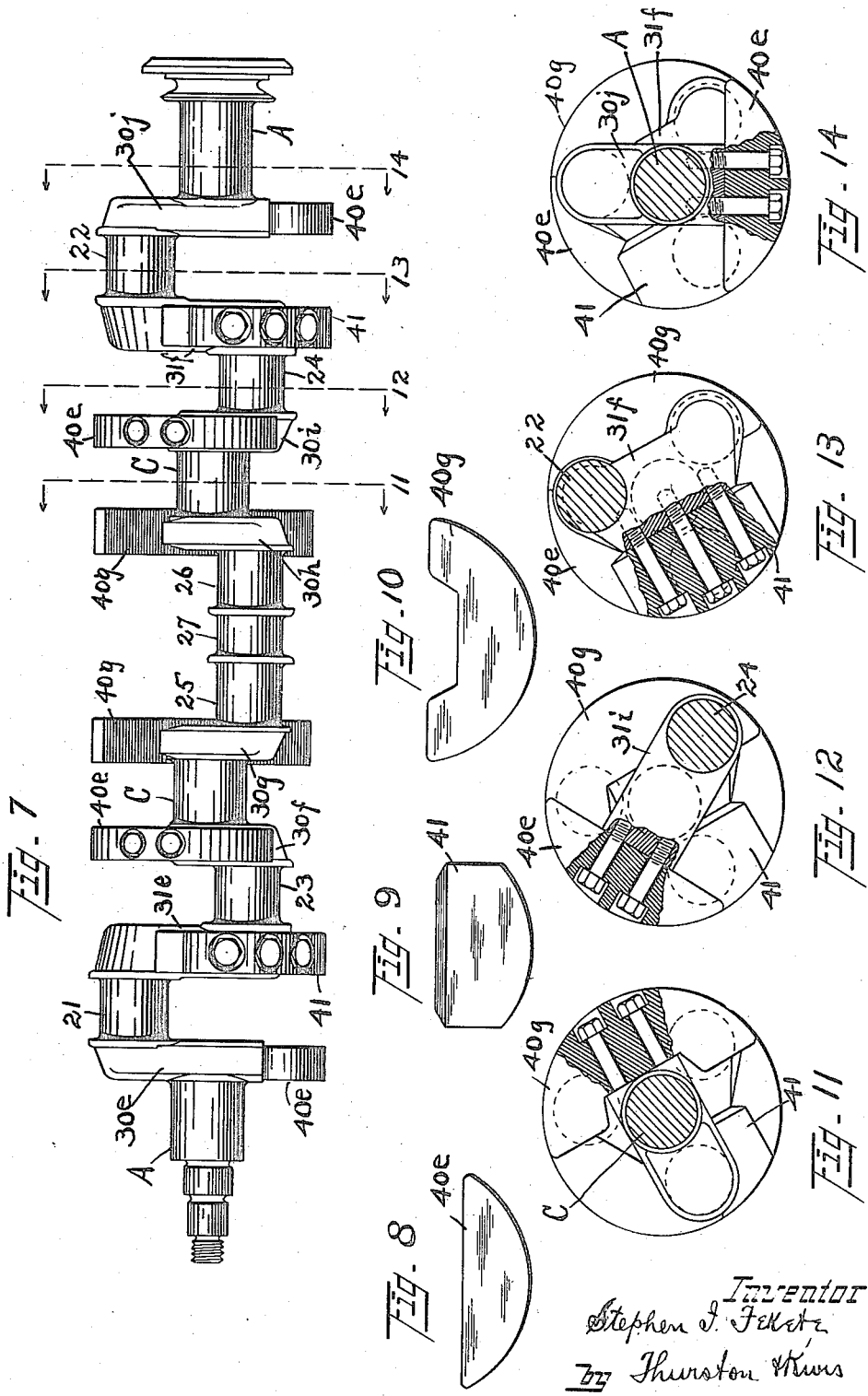

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN.

BALANCED CRANK-SHAFT.

1,165,861.   Specification of Letters Patent.   Patented Dec. 28, 1915.

Application filed June 28, 1915. Serial No. 36,602.

*To all whom it may concern:*

Be it known that I, STEPHEN I. FEKETE, a citizen of the United States, residing at Detroit, in the county of Wayne and State of Michigan, have invented a certain new and useful Improvement in Balanced Crank-Shafts, of which the following is a full, clear, and exact description.

The fundamental object of this invention is to substantially eliminate those vibrations and noises of a six-cylinder internal combustion engine which have heretofore been incident to running the engine at high speed; and to also increase the horse power of such engines; although it is applicable to any multithrow crank shaft whose crank pins are symmetrically arranged around the crank shaft in more than two radial planes and includes long crank arms which connect together two adjacent crank pins.

The invention is based upon the ascertainment that such vibrations and noises, and a considerable loss of efficiency, in such engines, as they are constructed, are due almost entirely to improper balancing of the six-throw crank shaft which such engines must and do have.

An ordinary six-throw crank shaft with the crank pins lying in radial planes 120° apart, is substantially in static balance. But when such a crank shaft is mounted in three bearings, or four bearings only, that is, two end bearings and either one or two intermediate bearings, and is constructed so that it may be so mounted, the lack of dynamic balance has been vaguely appreciated; but the means which have heretofore been proposed for remedying the defects have been effectual in only a very small degree. In fact, I do not believe that any one had any conception that a three or four bearing six-throw crank shaft, as ordinarily constructed, could be responsible for any considerable part of the vibration and noises developed by a six cylinder engine running at high speed, until I discovered the facts by a long series of research experiments. Much less did any one suppose that any mere change in the construction of such a crank shaft could increase the horse power efficiency of such an engine in any considerable degree.

The static balance of an ordinary six-throw crank shaft is due to the fact that the offcenter weights are distributed equally and symmetrically around the axis of the crank shaft; but these offcenter weights are connected with the shaft at different points lengthwise of said shaft. Therefore, when the shaft is in rotation, the centrifugal forces generated pull the shaft in different directions at different points in its length. When the speed of the shaft increases so that these forces can overcome the bending moment of the shaft each of these forces will produce shaft deflection. The components of these centrifugal forces, acting on the shaft at different points along its length, so coact that at each point lengthwise of the shaft there are forces which are not balanced, and which tend to distort the shaft, and in fact, do distort the shaft spirally. Moreover, these forces are constantly changing in direction with respect to the bearings in which the shaft rotates; and this constantly unbalanced reaction, ever changing in direction, has a destructive effect upon the bearings, more especially, those intermediate of the end bearings.

The present invention remedies these defects by applying to the shaft at each point thereon where an offcenter weight applies to the shaft a centrifugal pull in one direction, a counterweight which will apply to the same point on the shaft a counterbalancing centrifugal pull in the opposite and therefore corrective direction.

The invention consists in a crank shaft having the characteristics of construction shown in the drawings, hereinafter described, and pointed out definitely in the appended claims.

In the drawings, Figure 1 is an elevation of a three bearing six throw crank shaft; Fig. 2 is a perspective view of one of the counter weights which are connected with the long crank arms of said crank shaft; Figs. 3, 4, 5 and 6, are respectively transverse sectional views on lines 3—3, 4—4, 5—5, and 6—6, of Fig. 1; Fig. 7 is an elevation of a six throw four bearing crank shaft; Figs. 8, 9 and 10 are respectively side views of counter weights which are applied as hereinafter described to said crank shaft; Figs. 11, 12, 13 and 14 are respectively sectional views on lines 11—11, 12—12, 13—13, and 14—14 of Fig. 7.

Referring to the parts by reference characters, A A represent the end bearing portions, or, for brevity, the end bearings of the crank shaft.

B represents the center bearing of the three bearing crank shaft shown on Fig. 1.

C C represent the two intermediate bearings of the four bearing crank shaft shown in Fig. 7. The crank pins 21, 22, are disposed with their axes in alinement and in the same radial plane. The crank pins 23 and 24 are disposed with their axes in alinement and in the same radial plane which lies at an angle of 120° from the radial plane which contains the axis of the two crank pins 21, 22.

The crank pins 25, 26, are disposed with their axes in alinement and in the same radial plane,—which plane lies at an angle of 120° to each of the other two radial planes referred to. Some of these crank pins are connected with the crank shaft by short crank arms 30$^a$, 30$^b$, etc.; while in other cases two adjacent crank pins are connected with one another by long crank arms 31$^a$, 31$^b$, etc. For example, in the crank shaft shown on Sheet 1 the crank pins 21, 25, 26, and 22, are connected with the crank shaft respectively by the short crank arms 30$^a$, 30$^b$, 30$^c$, and 30$^d$. In this shaft the crank pins 21 and 23 are connected by long crank arms 31$^a$; the crank pins 23, 25, are connected by long crank arms 31$^b$; the crank pins 26, 24, are connected by long crank arms 31$^c$; and the crank pins 24, 22, are connected by long crank arms 31$^d$.

In the construction shown on Sheet 2, the crank pins 21, 23, 25, 26, 24 and 22, are connected with the crank shaft respectively by short crank arms 30$^e$, 30$^f$, 30$^g$, 30$^h$, 30$^i$ and 30$^j$; while the crank pins 21 and 23 are connected together by the long crank arms 31$^e$ and the two crank pins 24, 22, are connected together by the long crank arms 31$^f$.

A counterbalancing weight is provided for each of these crank arms and a part of one or more of the associated crank pins; and these counterbalancing weights are connected with the shaft at the same point as are the arms which they respectively counterbalance; for example, as shown on Sheet 2, a counterbalancing weight 40$^e$ is connected by bolts or other suitable means with a diametric continuation across the axis of the crank shaft of the arm 30$^e$, and this weight is of such size and its center of weight located at such distance from the axis of the crank shaft that at all speeds it will counterbalance the arm 30$^e$ and substantially one half of the crank pin 21. A similar weight 40$^e$ is connected in like manner to a diametrically opposed continuation of the short crank arm 30$^j$, so that at all speeds of rotation of the shaft it will counterbalance said short arm 30$^j$ and one half of the associated crank pin 22. A weight 40$^g$ is connected with a diametrically opposed continuation of the short arm 30$^g$, and it is of such weight and distance from the axis of the crank shaft that it counterbalances the short arm 30$^g$ to which it is connected, the crank pin 25, and one half of the piece 27 which is intermediate of the two crank pins 25, 26. A similar weight 40$^g$ is connected in like manner with a diametrically opposed continuation of the short arm 30$^h$ and it counterbalances said arm and the crank pin 26 and one half of the part 27 intermediate of the crank pins 25 and 26.

A counterweight 41 is connected with each of the four long crank arms of this crank shaft. Its center of weight is in a radial plane 120° removed from the two crank pins which are connected by the long arm to which the weight is attached. The weight lies on opposite side of the axis of the crank shaft from these two crank pins, and it is selected and disposed so that at all speeds of the shaft it will counterbalance the off-center weight of the long arm to which it is attached, and one half of each of the two crank pins which said arm connects. For example, (see Sheet 2), one of said weights 41 is connected with the long crank arm 31$^e$, extends from its point of connection across the axis of the crank shaft and its center of weight is in a radial plane of 120° removed from the radial planes in which lie the axes of the two crank pins 22, 24, and said weight 41 counterbalances the weight of the arm 31$^f$ and one half of each of the two crank pins 24, 22, which said arm connects.

In the construction shown on Sheet 1, the weights 40$^a$, 40$^b$, 40$^c$, and 40$^d$, which counterbalance each of the four short arms of this crank shaft are formed integrally with the crank shaft and said arms. Each of these is so located and is of such size that it counterbalances the short crank arm with which it is associated and one half of the crank pin with which said short arm is connected.

The weights 41 which are connected with the long arms of this crank shaft are arranged in respect to the crank pins which said long arms connect, precisely as before explained in connection with the shaft shown on Sheet 2, and each of these weights is of such size and such distance from the axis of the shaft that it counterbalances the long arm to which it is connected and one half of each of the two crank pins which said long arm connects.

From the foregoing it will appear that each offcenter weight of the described crank shafts is completely counterbalanced at all speeds of rotation by oppositely disposed offcenter counterbalancing weight which is connected with the crank shaft at the same point in the length thereof as is the offcenter weight which it counterbalances. Under these circumstances it is clear that at whatever rate the crank shaft is rotated, any force pulling at any point on the crank shaft tending to distort it, is counteracted by an equal force pulling in the opposite direction at the same point on the shaft.

While I have shown and described my invention as embodied in a crank shaft for the ordinary six cylinder engine, I do not limit myself to this particular embodiment of my invention which I believe to be of a basic character, but claim the same broadly for any use of which it is capable.

Having described my invention, I claim:

1. In a crank shaft having a plurality of crank pins which are symmetrically disposed around the shaft with their axes lying in more than two radial planes, short crank arms which connect some of said crank pins with the shaft, long crank arms, each of which connects two adjacent crank pins, a counterweight associated with each short crank arm and connected with said crank shaft at the same point in length thereof as that to which the associated short arm is connected thereto and extended therefrom in the opposite direction,—each of said counterweights being a counterbalance to the associated short crank arm and one half of the associated crank pin, and other counterweights each of which is connected with a long crank arm and extends therefrom across the center from the two associated crank pins and angularly equidistant from said two associated crank pins, said last named counterweights being each a counterbalance to the long crank arm to which it is connected and one half of its two associated crank pins.

2. A six throw crank shaft having crank pins which are symmetrically disposed around the shaft and which consists of a plurality of balanced longitudinal sections, some sections consisting of a short crank arm and one half of an associated crank pin and an oppositely disposed counterbalancing weight which is connected with the crank shaft at the same point in the length thereof as that to which the associated short crank arm is connected, and the other sections consisting of one half of two associated crank pins and a long arm which connects said crank pins and an oppositely disposed counterbalancing weight which is connected with said long arm and is located 120° from both of the crank pins which said long arm connects and across the center of the shaft from both of said crank pins.

3. A crank shaft having six crank pins symmetrically disposed in pairs about the shaft pins some of which are each connected with the shaft by a short crank arm and some of which are connected together in pairs by long crank arms a counterbalancing weight fixed to each short arm and extending on the opposite sides of the axis of the crank shaft, and a counterbalancing weight which is connected with each long arm and extends therefrom to a point such that its center of weight is across the center from and is 120° removed from the axis of the two crank pins which said long arm connects.

4. A six throw crank shaft for internal combustion engines which consists of a plurality of balanced longitudinal sections each of which sections consists of a crank arm, a part only of one or more associated crank pins, and a weight which counterbalances said crank arm and said part of said crank pin or pins.

5. A six-throw crank shaft which comprises a plurality of crank pins symmetrically arranged about the axis in pairs in three radial planes and which comprises a plurality of balanced longitudinal sections, each of which sections consists of a crank arm, a part only of one or more associated crank pins and a weight which counterbalances said crank arm and said part of said crank pin or pins.

6. A crank shaft for internal combustion engines, having crank arms, three crank pins equidistant angularly from each other associated with adjacent crank arms, said crank shaft comprising sections each of which consists of a crank arm, a part only of one or more of its said associated crank pins, and a weight which counterbalances said crank arm and said part of said crank pin or pins.

In testimony whereof, I hereunto affix my signature in the presence of two witnesses.

STEPHEN I. FEKETE.

Witnesses:
J. L. VETTE,
E. W. SHELDINK.

Corrections in Letters Patent No. 1,165,861.

It is hereby certified that in Letters Patent No. 1,165,861, granted December 28, 1915, upon the application of Stephen I. Fekete, of Detroit, Michigan, for an improvement in "Balanced Crank-Shafts," errors appear in the printed specification requiring correction as follows: Page 3, line 58, claim 3, strike out the word "pins;" same page and line, after the word "which" insert the word *pins;* and that the said Letters Patent should be read with these corrections therein that the same may conform to the record of the case in the Patent Office.

Signed and sealed this 11th day of January, A. D., 1916.

[SEAL.]

J. T. NEWTON,
*Acting Commissioner of Patents.*